United States Patent Office 3,409,518
Patented Nov. 5, 1968

3,409,518
ORGANIC HALIDE RECOVERY
David G. Braithwaite, Chicago, Ill., assignor to Nalco Chemical Company, Chicago, Ill., a corporation of Delaware
No Drawing. Continuation-in-part of application Ser. No. 351,021, Mar. 11, 1964. This application Jan. 6, 1966, Ser. No. 518,974
21 Claims. (Cl. 204—59)

ABSTRACT OF THE DISCLOSURE

Organic halides are removed from liquid glycol diethers by heating the mixture of the glycol diether containing the organic halide and a stripping solvent which boils below the boiling point of the glycol diether, the temperature of heating being above the boiling point of the stripping solvent but below the boiling point of the glycol diether, and the volatilized components comprising the organic halide are separated from the residual body of liquid comprising the glycol diether. The process is especially useful in separating an organic halide, such as methyl chloride or ethyl chloride, from an electrolyte containing tetraalkyl lead compounds and a glycol diether, using tetrahydrofuran as a stripping solvent.

---

This application is a continuation-in-part of application Ser. No. 351,021 filed Mar. 11, 1964.

The invention relates to an organic halide recovery process and more particularly to a process for recovering organic halides from an electrolyte obtained in the manufacture of an organo metallic compound by electrolyzing a Grignard reagent dissolved in at least one anhydrous organic solvent, together with excess organic halide, using a sacrificial metal anode. The invention is especially concerned with a process for recovering free organic halide from an electrolyte of the type described after it has been electrolyzed and before the organo metallic compound has been removed therefrom.

The manufacture of organo metallic compounds, and more specifically organo lead compounds, by electrolyzing an anhydrous solution of a Grignard reagent in an organic solvent for the Grignard reagent is disclosed in U.S. Patent 3,007,857 and 3,007,858. In the process disclosed in U.S. 3,007,858 an excess of organic halide is added to the electrolyte. The term "Grignard reagent" refers to a complex organo magnesium compound which is commonly prepared by reacting magnesium with an organic halide. The term "organic halide" refers to organic chlorides, bromides and iodides. The halogen portion of the added organic halide does not have to be the same as the halogen portion of the Grignard reagent but in practice they are usually the same and the organic chlorides are most commonly employed because of their ready availability.

When lead is used as a sacrificial anode in an organic solvent solution of a Grignard reagent, organo lead compounds are formed. The cathode can be composed of any suitable conducting but non-reacting material, including, for example, ordinary steel, stainless steel, platinum, graphite, or the like. Ordinarily, the anode is composed of lead and the cathode of steel.

In carrying out a process of the type previously described, one type of organic solvent for the Grignard reagent which has been found to be especially suitable is a diether of a polyalkylene glycol. Very good results have been obtained by using a mixture of solvents, particularly a mixture of at least two co-solvents, one of which is tetrahydrofuran and the other a relatively high boiling ether.

Various diethers of glycols have been employed as solvents or co-solvents. Water immiscible diethers of glycols can be used, for example, the dibutylether of diethylene glycol, the hexylethylether of diethylene glycol, or the benzylethylether of triethylene glycol. Water miscible diethers of glycols can likewise be used, for example, the diethylether of diethylene glycol, the diethylether of triethylene glycol, the diethylether of tetraethylene glycol or the diethylether of pentaethylene glycol.

One way of carrying out an electrolytic process of the type described is to electrolyze the electrolyte until the Grignard reagent is almost exhausted. The effluent from the electrolytic cell is then treated to recover the organo metallic compound which is water insoluble. Another possibility is to partially electrolyze the electrolyte, recover the organo metallic compound and recycle the electrolyte.

In a process of the type described it is very important from an economic standpoint to recover the excess organic halide from the electrolyte. To this end it has been proposed to pass the electrolyte after electrolysis into a surge drum where organic halides such as ethyl chloride or methyl chloride are liberated as gases. It has also been proposed to pass the cell effluent through a packed tower or a stripping tower to cause agitation of the liquid effluent and liberation of gaseous organic halides. However, these procedures are not very efficient with the result that significant quantities of organic halides remain dissolved in the solvents present in the effluent and must be recovered later or are lost during the recovery of the solvents and organo metallic compounds. Organic halides not recovered can also be a source of pollution.

One of the objects of the present invention is to provide a new and improved process for recovering organic halides from solvent solutions, especially solvent solutions containing glycol diethers.

A further object of the invention is to provide a new and improved recovery system for recovering organic halides from solvent solutions containing both glycol diethers and tetrahydrofuran.

Another object of the invention is to provide a new and improved process for recovering organic halides which boil at temperatures below 60° C. at atmospheric pressure from a glycol diether which is liquid at 60° C. at atmospheric pressure but boils at a temperature above 118° C. at atmospheric pressure.

An additional object of the invention is to provide a new and improved recovery system for recovering organic halides from the cell effluent (spent electrolyte) obtained by the electrolysis, using a sacrificial anode, of a Grignard reagent dissolved in a mixture of solvents at least one of which is a glycol diether and another tetrahydrofuran, which may also contain other solvents as, for example, liquid aromatic hydrocarbons.

More specific objects of the invention are the recovery of relatively low boiling alkyl halides, such as, methyl chloride and ethyl chloride, from the cell effluent obtained by the electrolysis, using a sacrificial lead anode, of a Grignard reagent dissolved in a glycol diether containing as a co-solvent tetrahydrofuran. Other objects will appear hereinafter.

In accordance with the invention it has been found that an organic halide can be removed from a liquid glycol diether by mixing the liquid glycol diether containing said organic halide with a stripping solvent having a boiling point below that of the glycol diether, preferably a low boiling ether, heating the mixture above the boiling point of the stripping solvent but below the boiling point of the glycol diether and separating the volatilized components comprising said organic halide and the stripping solvent from the residual body of liquid comprising said glycol diether. The expression "a glycol diether" is intended to cover a single glycol diether or a mixture of glycol diethers.

In the practice of the invention the stripping solvent which has been found to be most effective is tetrahydrofuran which boils around 64–66° C. The glycol diethers normally have boiling points of at least 118° C. and in most cases above 150° C. Among other stripping solvents, mention may be made of dimethylether, diethylether, dipropylether, methylethylether, methoxy propane, methylisopropylether, ethyl n-propyl ether, ethylisopropylether, diallyl ether, and diethoxy methane. These ethers, except dimethylether, boil within a range of 35° C. to 94° C. at atmospheric pressure.

The invention is particularly important in the recovery of methyl chloride and ethyl chloride which boil, respectively, at −24° C. and 12° C., at atmospheric pressure. In general, the invention is especially useful for the recovery of organic halides which boil at temperatures below 60° at atmospheric pressure.

A low boiling ether having a boiling point within the range of 60–100° C. is especially advantageous in the practice of the invention because it acts as a stripping solvent for the organic halide and at the same time boils below the boiling point of the organo metallic compound. Hence, when a solvent mixture containing an organo metallic compound is heated above the boiling point of a stripping solvent, such as tetrahydrofuran, but below the boiling point of the organo metallic compound, it removes the organic halide from the residual solvent without removing significant quantities of the organo metallic compound. The latter can then be recovered from the residual solvent. Where the organo metallic compound is tetramethyl lead small amounts are removed by the stripping solvent along with the organic halide but the resultant mixture can be recycled and reused in the process, either by introducing it into the electrolyte in subsequent operations, or by using it in making up the Grignard reagent. In making organometallic compounds in the manner described it will be observed that at least a part of the stripping solvent is present in the electrolyte during electrolysis.

For the purpose of the invention the quantity of the stripping solvent, e.g., tetrahydrofuran, should be relatively high in proportion to the amount of organic halide, preferably within the range of 10:1 to 35:1. The quantity of the stripping solvent should also be fairly high with respect to the quantity of glycol diether solvents in the mixture from which the organic halide is removed. A suitable range of proportions of stripping solvent to glycol diether solvent in such mixtures is from 0.5:1 to 3:1.

The quantity of organic halide present in solvent mixtures of the type described is usually less than 10% and in most cases not more than about 4% by weight of the mixture. While it might seem that the recovery of relatively small amounts of organic halides is not of great practical importance, in a commercial manufacture where large quantities of materials are being processed, the recovery of even a fraction of 1% of organic halide is very important from the economic standpoint and also to facilitate subsequent operations and to prevent pollution.

In a process of the type described, a preferred way of heating the mixture is to pass a hot gaseous hydrocarbon therethrough, preferably hot natural gas, heated to a temperature of 85° C. to 150° C.

The invention will be further illustrated but is not limited by the following examples in which the quantities are stated by weight unless otherwise indicated.

Example I

The apparatus used was a vacuum jacketed ten plate Oldershaw column having an inner diameter of 20 mm. and a height of 48 cm. This column was connected at the bottom to a sealed outlet on a one liter flask, the bottom of which was provided with an electrically heated heating mantle. The flask was also provided with a thermometer and a valved inlet-outlet for the introduction and removal of the contents. A feed tray equipped with a thermometer and having an inlet was sealed to the top of the column. Above the feed tray was a still head equipped with a thermometer and a hot condenser also equipped with a thermometer. The overhead from the hot condenser passed to a cold condenser and the effluent from the cold condenser passed successively through two traps, the first trap being empty and the second containing a glycol diether solvent. The cold condenser was cooled with ice cold water. The temperature of the hot condenser was maintained with hot water. The feed liquid containing organic halide was held in a feed reservoir and pumped to the feed tray through a preheater.

The cell effluent obtained by electrolyzing methyl magnesium chloride containing excess methyl chloride and dissolved in a mixture of the diethylether of tetraethylene glycol (hereinafter called DETEG) and tetrahydrofuran (hereinafter called THF) together with tetramethyl lead and magnesium chloride was fed through the preheater to the feed tray at a rate of 5 ml. per minute.

The first liter of feed contained 0.6% methyl chloride. All subsequent charges of feed contained 2.2% methyl chloride.

The cell effluent contained 0.18 millimole per gram of OH, 1.39 millimoles per gram of magnesium, 2.64 millimoles per gram of chlorine and 0.56 millimole per gram of lead. The specific gravity was 1.124 at 25° C. A total of 1124 grams of feed containing 0.6% methyl chloride, and 2961 grams of feed containing 2.2% methyl chloride was charged to the unit. The second trap was charged with three separate charges of 200 grams each of DETEG as a gas absorbent. The weight ratio of THF to DETEG was 60:40.

The temperature in the preheater averaged around 63° C. to 71° C., the temperature in the feed tray averaged around 63° C. to 77° C., the temperature at the still head averaged around 64° C. to 67° C., the overhead temperature beyond the hot condenser averaged 60° C. to 70° C., the temperature at the hot condenser averaged 60° C. to 75° C. and the temperature in the one liter flask averaged 75° C. to 87° C. The run was carried out over a period of approximately 6 hours and an analysis was made from time to time of samples of the contents of the one liter flask. This analysis showed that all but about 0.05 to 0.2% by weight of the methyl chloride was removed. A part of the methyl chloride which was removed was recovered in the first trap and the remainder in the second trap containing 200 grams of DETEG. The overhead condensate also contained 3% to 5% of tetramethyl lead. The operation was generally smooth.

Example II

The same apparatus was used as in Example I.

The initial temperature of the preheater was 135° C. but this was reduced in a relatively short time to a temperature within the range of 88° C. to 109° C. The temperature of the stripping tower feed tray was 29° C. at the start and within a short time averaged between 64° C. and 72° C. The temperature of the flask at the bottom of the stripping column was within the range of 78 C. to 91° C. The overhead temperature ahead of the hot condenser was 70° C. at the start and averaged between 62° C. and 83° C. The hot condenser was maintained at a temperature within a range of 65° C. to 85° C. The rate of feed was 5 ml. per minute.

The cell effluent consisted of a small amount of unreacted ethyl magnesium chloride, excess ethyl chloride, magnesium chloride, tetraethyl lead, and a solvent composed of 60% by weight THF and 40% by weight DETEG. The effluent separated into two layers consisting of 100 parts in the top layer and 9 parts in the bottom layer. The top layer analyzed 0.12 millimole per gram of OH, 1.76 millimoles per gram of magnesium, 3.40 millimoles per gram of Cl, and 0.31 millimole per gram of lead. This layer contained 3.1% by weight ethyl chloride. The bottom layer analyzed 0.02 millimoles per gram OH, 0.42 millimole per gram magnesium 0.39 millimole per gram Cl and 1.20 millimoles per gram of lead. The bottom layer contained 4% by weight ethyl chloride.

The process was carried on for 3½ hours under the foregoing conditions and samples were taken from time to time from the residue in the one liter flask. These samples showed 0.25% to 0.3% by weight ethyl chloride. The remainder of the ethyl chloride was removed and most of it recovered in the two traps. In the first trap the recovery consisted of 84.9% THF and 15.1% ethyl chloride. In the second trap to which DETEG had been added, 0.2% by weight ethyl chloride was recovered. The overall recovery was 97% and the overall recovery of ethyl chloride was 93.8%.

Example III

The cell effluent from the manufacture of tetraethyl lead by a process of the type previously described contained 268 parts ethyl chloride, 5465 parts THF, 2345 parts DETEG, 2300 parts tetraethyl lead, and 1540 parts magnesium chloride. This was passed into a surge tank and then to a preheater where it was heated to a temperature of 85° C. It was then passed to a stripping tower where it was introduced in the upper part of the tower. The lower part of the tower was provided with a reheater in which hot water was circulated in heat exchange relationship, to maintain a temperature of about 91° C. The overhead from the stripping tower at a temperature of about 70° C. passed to a condenser and the condensate passed to an accumulator. Overhead gases from the accumulator were passed to vent scrubber where they were scrubbed with DETEG and combustible gases were vented and burned. The rate of feed was 155 parts per hour.

The residue at the bottom of the stripping tower contained 20 parts ethyl chloride, 3465 parts THF, 2345 parts DETEG, 2300 parts TEL and 1540 parts magnesium chloride.

The condensate from the overhead collected in the accumulator contained 206 parts ethyl chloride and 1937 parts THF. The overhead from the accumulator contained 63 parts THF and 42 parts ethyl chloride which were scrubbed with 2345 parts of DETEG in the vent scrubber. The DETEG from the vent scrubber containing the THF and ethyl chloride were recycled for use in making more Grignard reagent. Similarly the condensate in the accumulator was recycled either to the cell or to the reactor for making more Grignard reagent.

Example IV

The procedure was the same as in Example III except that the effluent was obtained in the manufacture of tetramethyl lead from methyl magnesium chloride containing excess methyl chloride dissolved in a solvent consisting of THF, DETEG and toluene and electrolyzed, using a lead anode. The effluent contained 210 parts methyl chloride, 5625 parts THF, 2415 parts DETEG, 214 parts toluene, 1930 parts tetramethyl lead and 1540 parts magnesium chloride.

The bottoms from the stripping tower contained 10 parts methyl chloride, 4780 parts THF, 2415 parts DETEG, 211 parts toluene, 1900 parts tetramethyl lead, and 1540 parts magnesium chloride.

The bottoms from the accumulator contained 73 parts methyl chloride, 527 parts THF, 10.5 parts toluene, and 30 parts tetramethyl lead. The overhead from the accumulator contained 127 parts methyl chloride and 318 parts of THF. This was scrubbed with 2415 parts DETEG and recycled for use in the process.

Example V

The procedure was the same as in Examples III and IV except that natural gas at an average temperature of 150° C. was introduced in the lower part of the stripping tower at a rate of 5 to 10 cubic feet per hour.

While the foregoing examples illustrate the invention particularly with respect to the use of THF as the stripping solvent and DETEG as the glycol diether, it will be understood that the invention is also applicable to the use of other stripping solvents and co-solvents of a similar type including the water immiscible glycol diethers and the water miscible glycol diethers previously mentioned. These glycol diethers can be defined by the general formula $$R_1(OC_nH_{2n})_xOR_2$$

where $R_1$ and $R_2$ are the same or different hydrocarbon radicals, $n$ is 2 to 6 and $x$ is an integer, preferably 2 to 6. The oxyalkylene radicals represented by $(OC_nH_{2n})$ can be and preferably are all oxyethylene radicals but they can also be, for example, all oxy-1,2-propylene, or all oxy-1,2-butylene, oxyamylene, or oxyhexylene, or mixtures either in random or sequential succession, such as, for example, or $$-OC_2H_4 \cdot OC_3H_6-$$

or $$-OC_2H_4 \cdot OC_3H_6 \cdot OC_2H_4-$$

or $$-OC_2H_4 \cdot OC_2H_4 \cdot OC_3H_6 \cdot OC_2H_4 \cdot OC_2H_4-$$

or $$-OC_2H_4 \cdot OC_3H_6 \cdot OC_3H_6 \cdot OC_2H_4-$$

or $$-OC_2H_4 \cdot OC_4H_8 \cdot OC_2H_4$$

Preferred diethers are those in which $R_1$ and $R_2$ are hydrocarbon radicals containing 2 to 7 carbon atoms, $n$ is 2 and $x$ is 3 to 6.

In general, the hydrocarbon radicals (including the alkylene radicals) in the formula should be of such configuration and chain length, either straight or branched, that the solvent is normally liquid under the electrolytic conditions and preferably normally liquid at 20° C.

To illustrate the glycol diethers more specifically, in the formula $n$ can be 2 or 3 or both 2 and 3, $x$ can be 3 or 4 and $R_1$ and $R_2$ can both be methyl, or both ethyl, or both propyl, or both butyl, or both amyl, or both hexyl, or both phenyl, or one can be ethyl and the other phenyl, or one can be ethyl and the other benzyl, or one can be ethyl and the other hexyl. Some of these diethers are water miscible e.g., the diethyl ether of tetraethylene glycol, and others are water immiscible (e.g., the hexyl ethyl ether of diethylene glycol), depending upon the number of oxyethylene groups present, and the chain length of the hydrocarbon groups. In general, water solubility is increased by the addition of oxyethylene groups.

The term "Grignard reagent" as used herein refers to the product obtained by reacting approximately equimolar proportions of a compound having the formula RX and Mg according to the equation:

$$RX + Mg \rightarrow RMgX$$

in which R represents the organic radical, X represents the halogen atom of the Grignard reagent, and Mg is the conventional symbol for magnesium. The radical R can be, for example, methyl, ethyl, propyl, isopropyl, butyl and higher homologues, phenyl, benzyl and the like. The radical X can be for example, chlorine, bromine or iodine.

While the invention has been illustrated with the preparation of organic lead compounds, it will be apparent that the metal of the anode can be another metal capable of dissolving when used as an anode in an anhydrous organic solvent solution of a Grignard reagent. Examples of such other metals are aluminum, calcium, zinc, cadmium, manganese, mercury, lanthanum, thallium, arsenic, bismuth, tellurium and selenium.

This process can be carried out under atmospheric, subatmospheric and superatmospheric pressure conditions.

The invention solves an important problem in the recovery of organic halides from glycol diether solvents. This is an important factor in the economy of the process of the type previously described. It is also an important factor in preventing pollution of the atmosphere or pollution due to discarded by-products. The invention makes it possible to reuse the organic halides as well as the solvents used in their recovery. The removal of the organic halides from the recovery system in making organo metallic compounds also minimizes subsequent handling problems in the recovery of the organometallic compounds. The latter can be recovered more simply and efficiently in any suitable manner. The final recovery of organo metallic compounds does not constitute a part of this invention.

The invention is hereby claimed as follows:

1. A process for separating an organic halide from a liquid glycol diether which comprises heating a mixture of said glycol diether containing said organic halide and a stripping solvent having a boiling point below that of said glycol diether above the boiling point of the stripping solvent but below the boiling point of the glycol diether, the weight ratio of said stripping solvent to said organic halide being at least 10:1, and separating the volatilized components comprising said organic halide and said lower boiling stripping solvent from the residual body of liquid comprising said glycol diether.

2. A process as claimed in claim 1 in which said stripping solvent is tetrahydrofuran.

3. A process as claimed in claim 1 in which said organic halide is a lower alkyl halide.

4. A process as claimed in claim 1 in which the weight ratio of said stripping solvent to said organic halide is within the range of 10:1 to 35:1.

5. A process as claimed in claim 1 in which the weight ratio of said stripping solvent to said glycol diether is within the range of 0.5:1 to 3:1.

6. A process as claimed in claim 1 in which a gaseous hydrocarbon is passed through said mixture from an external source.

7. In a process for making an organometallic compound from an electrolyte wherein a Grignard reagent dissolved in at least one anhydrous organic solvent comprising a glycol diether together with excess organic halide is electrolyzed, using a sacrificial metal anode, and the organo metallic compound is recovered from the electrolyte, the steps which comprise heating said electrolyte and stripping organic halide therefrom with an anhydrous stripping solvent for said organic halide, said stripping solvent boiling below the boiling point of said glycol diether and said organo metallic compound and the temperature of heating being at least as high as the boiling point of said stripping solvent but below the boiling point of said glycol diether and said organo metallic compound, the weight ratio of said stripping solvent to said organic halide being within the range of 10:1 to 35:1, and recovering organo metallic compound from the residual electrolyte.

8. A process as claimed in claim 7 in which at least part of said stripping solvent is present in the electrolyte during electrolysis.

9. A process as claimed in claim 7 in which said stripping solvent containing recovered organic halide is recycled for reuse in the process.

10. A process as claimed in claim 7 in which said stripping solvent is tetrahydrofuran.

11. A process as claimed in claim 7 in which said Grignard reagent is methyl magnesium chloride, the sacrificial anode is lead, and the stripping solvent is tetrahydrofuran.

12. A process as claimed in claim 7 in which said Grignard reagent is ethyl magnesium chloride, the sacrificial anode is lead, and the stripping solvent is tetrahydrofuran.

13. A process as claimed in claim 7 in which said electrolyte is heated at least in part during said stripping process by passing a heated inert hydrocarbon gas from an external source therethrough.

14. A process as claimed in claim 13 in which said hydrocarbon gas is natural gas.

15. A process as claimed in claim 7 in which said electrolyte is preheated before stripping said organic halide.

16. A process as claimed in claim 7 in which said electrolyte is preheated before stripping said organic halide and reheated during said stripping.

17. A process as claimed in claim 7 in which said stripping solvent containing organic halide is combined with a high boiling glycol diether solvent for the Grignard reagent having a boiling point above 150° C. and the combined solvent and organic halide is recycled for reuse in the process.

18. A process as claimed in claim 7 in which said stripping solvent has a boiling point within the range of 60° C. to 100° C.

19. A process as claimed in claim 17 in which said high boiling solvent is a diether of a polyethylene glycol having two to six ethylene groups in the glycol portion.

20. A process as claimed in claim 17 in which said high boiling solvent is the diethyl ether of tetraethylene glycol.

21. A process as claimed in claim 17 in which said high boiling solvent is the hexylethylether of diethylene glycol.

References Cited

UNITED STATES PATENTS 3,164,537    1/1965    Linsk et al. _____ 204—59

FOREIGN PATENTS 1,287,026    1/1962    France.

HOWARD S. WILLIAMS, *Primary Examiner.*